Patented May 18, 1937

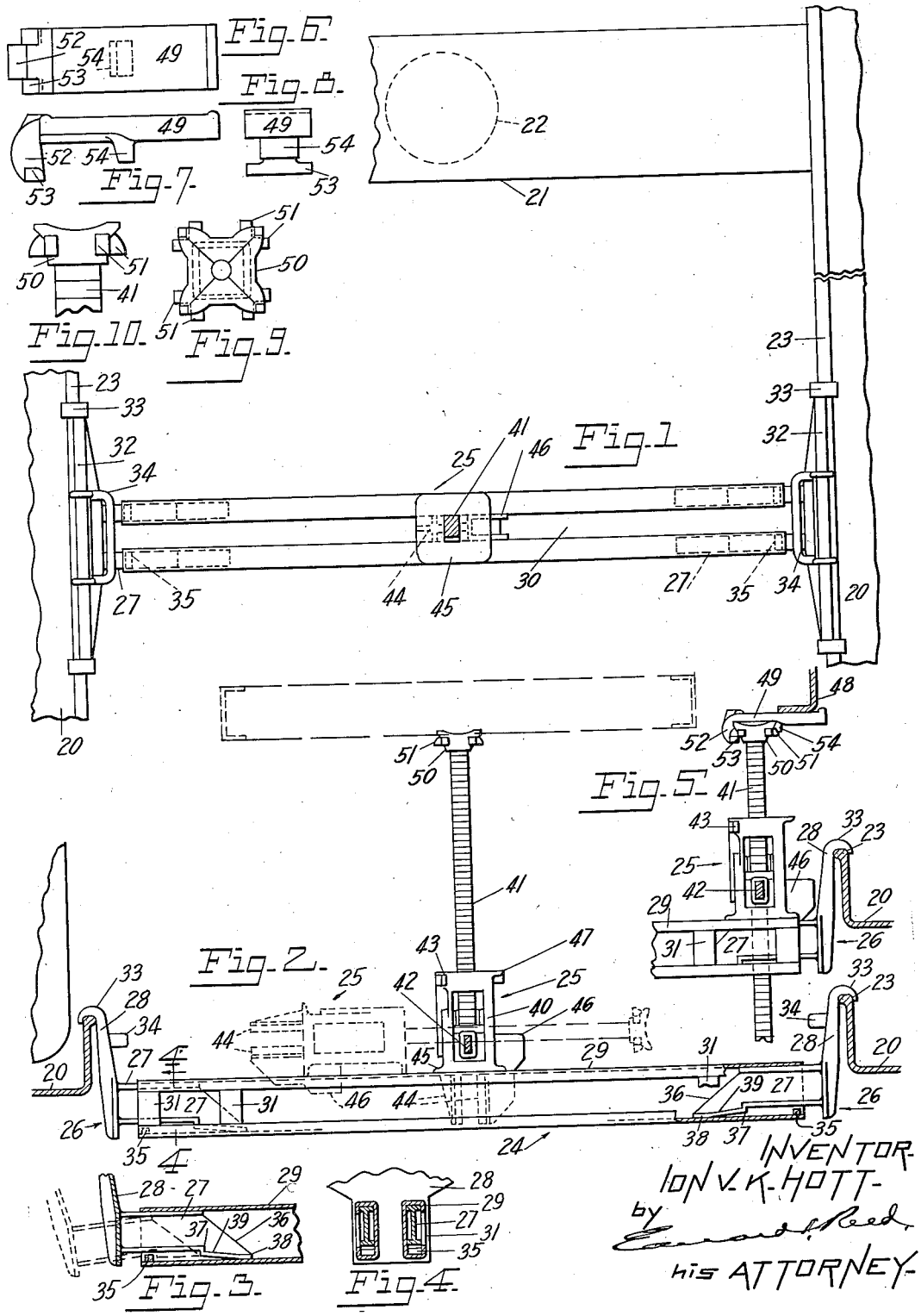

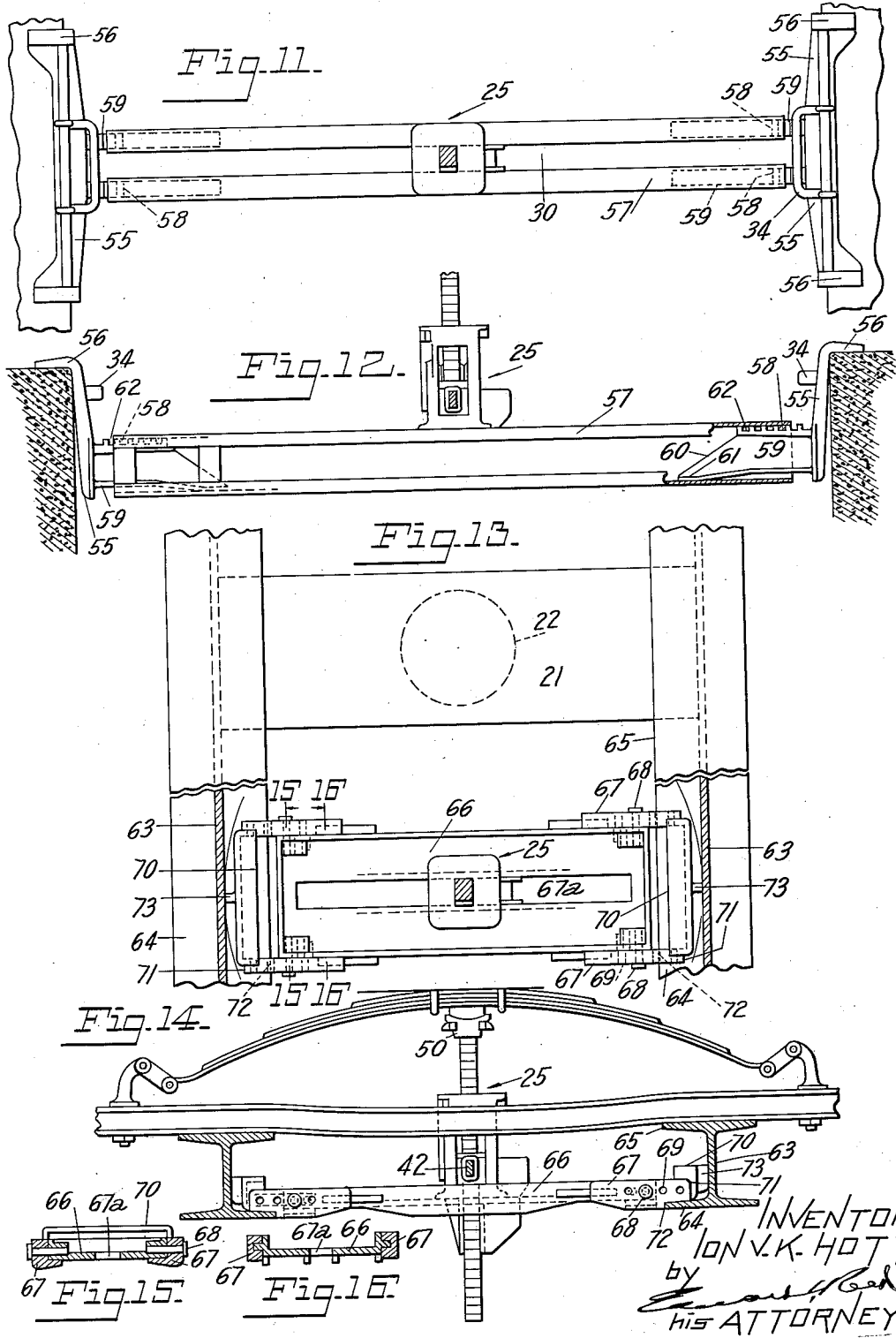

2,080,481

UNITED STATES PATENT OFFICE 2,080,481

LIFTING MECHANISM FOR AUTOMOBILES AND THE LIKE

Ion V. K. Hott, Dayton, Ohio, assignor to The Joyce-Cridland Company, Dayton, Ohio, a corporation of Ohio Application April 22, 1935, Serial No. 17,667

16 Claims. (Cl. 254—89)

This invention relates to lifting mechanism for automobiles and the like and more particularly to a supplemental lift adapted to be mounted on an automobile support, such as a power operated lift, for the purpose of elevating a part of the automobile with relation to said support to facilitate the servicing thereof.

It has been proposed heretofore to provide a supplemental lift adapted to be mounted on an automobile lift, or other support, of the runway type to free one or more of the wheels from the runways to permit them to be rotated for the purpose of making repairs or adjustments or to elevate the body with relation to the axle to separate the leaves of the springs to permit the latter to be lubricated, such a supplemental lift being shown and described in my Patent No. 1,993,060, of March 5, 1935.

One object of the present invention is to provide a supplemental lift having improved means for mounting the same on the runways and for adjusting the same to accommodate it to the distance between the runways.

A further object of the invention is to provide such a supplemental lift in which the hangers may be connected with the base of the cradle and adjusted with relation thereto without the use of removable retaining devices.

A further object of the invention is to provide a supplemental lift in which the lifting jack may be folded into a substantially horizontal position adjacent to the cradle and out of the path of an automobile which is being driven onto the main lift.

A further object of the invention is to provide a supplemental lift in which the lifting jack may have supporting engagement with a part of the automobile which is not in alinement with the lifting element.

A further object of the invention is to provide a supplemental lift which can be quickly and easily attached to the rails of a free wheel automobile lift.

A further object of the invention is to provide a supplemental lift which will be simple in construction and of a strong durable character, and which can be manufactured at a low cost.

Other objects of the invention will appear as the apparatus is described in detail.

In the accompanying drawings Fig. 1 is a plan view of a supplemental lift embodying my invention, showing the same mounted on the runways of an automobile lift, and with the lifting element of the jack broken away; Fig. 2 is a front elevation of the supplemental lift, partly in section; Fig. 3 is a sectional detail view taken lengthwise of a portion of the cradle; Fig. 4 is a transverse section taken on the line 4—4 of Fig. 2; Fig. 5 is a front elevation of a portion of the supplemental lift showing the jack provided with a supplemental load supporting member; Fig. 6 is a plan view of the supplemental load supporting member; Fig. 7 is a side elevation of the supplemental load supporting member; Fig. 8 is an end view of the supplemental load supporting member; Fig. 9 is a plan view of the head of the lifting element of the jack; Fig. 10 is a side elevation of said head; Fig. 11 is a plan view of a slightly modified form of supplemental lift with the lifting element of the jack broken away; Fig. 12 is a front elevation of the supplemental lift shown in Fig. 11, partly in section; Fig. 13 is a plan view of a supplemental lift adapted to be mounted on the rails of a free wheel automobile lift, with the lifting element broken away; Fig. 14 is a front elevation of a supplemental lift of the free wheel type; Fig. 15 is a transverse section taken on the line 15—15 of Fig. 13; and Fig. 16 is a transverse section taken on the line 16—16 of Fig. 13.

The supplemental lift shown in Figs. 1 to 4 is designed primarily for use on an automobile lift of the runway type. Such an automobile lift comprises parallel runways, parts of which are shown at 20, and which are rigidly connected between their ends with a transverse supporting member 21 which is carried by a vertically movable lifting element 22, such as the ram of a hydraulic lift. The supplemental lift comprises a cradle arranged between and extending transversely to the runways 20 and having at its ends means for detachably supporting the same on the runways. Each runway is usually provided at its inner edge with a vertically extending projection or flange 23 to prevent the wheels of the automobile from being driven off the runways and in such a construction the cradle is supported on the upper edges of flanges 23. The cradle comprises a base 24 adapted to support a jack 25 and of a length somewhat less than the distance between the runways 20, and this base has at each end thereof hangers 26 adapted to engage the flanges 20 and support the cradle on the runways. Preferably the base of the cradle is tubular, at least at its ends, and the hangers comprise connecting members 27, adapted to extend into the respective ends of the tubular base, and supporting members 28 rigidly secured to the outer ends of the connecting members and adapted to engage the flanges of the runways. In the present construction the base comprises two tubular members 29 arranged parallel and spaced one from the other to provide between them a longitudinal slot or guideway 30. These two tubular members may be connected one to the other in any suitable manner but preferably each hanger 26 is provided with two connecting members 27 which extend into the respective tubular members of the base and constitute the sole means for connecting the tubular members one to the other, thus permitting the guideway 30 to extend for the full length of the base. The tubular members of the base may be of any suitable construction and shape but each member may conveniently be manufactured by bending a strip of heavy sheet metal into the form of a tube substantially rectangular in cross section, as shown in Fig. 4, and of a width or thickness substantially less than its depth. The outer walls of the tubular members need not be continuous but the edges of the strip may be spaced apart, as shown in Figs. 2 and 4, and rigidly connected one to the other by narrow plates or metal strips 31 rigidly secured thereto, as by welding.

The supporting member 28 of each hanger extends upwardly from the connecting member 27 and has a relatively wide upper portion, the upper edge of which extends outwardly, as shown at 32, into overlapping engagement with the upper edge of the flange 23. The intermediate part of this overlapping portion does not extend beyond the outer surface of the flange but the supporting member is provided at the front and rear ends of this upper portion with hook-shaped parts 33 which engage over the upper edge of the flange so as to hold the supporting member against lateral displacement with relation to the flange. These hooks 33 are spaced apart such a distance that they may engage over the flange in front of and to the rear of the tire on the wheel, in the event that tire is close to or in engagement with the flange 23. Each supporting member is also provided with a handle 34 by means of which the cradle may be readily lifted into and out of its position on the runways.

The connecting members 27 of the hangers and the respective tubular ends of the base are provided with cooperating parts which will maintain the connection between the base and the hangers but which will permit of the ready adjustment of the hangers with relation to the base to vary the length of the cradle and thus accommodate it to different distances between the runways. This connection is of such a character that the hangers may be connected with or disconnected from the base and retained in position thereon without the use of retaining devices other than the cooperating stops, and hence it is not necessary to insert or remove any retaining device in establishing a connection. In the particular construction shown, each tubular member of the base is provided near its outer end with a part forming a stop, this part being preferably in the form of a small block of metal mounted on the bottom wall of the tubular member near the end thereof, by welding or otherwise, as shown at 35. Each connecting member is here shown as I-shaped in cross section and as having its inner end inclined upwardly and outwardly, as shown at 36, so that the connecting member is pointed in shape. The inner part of the lower edge of the connecting member is offset downwardly with relation to the outer portion of that lower edge to form an outwardly facing shoulder 37 which constitutes a stop to cooperate with the stop 35 of the base member, and this also results in the outer portion of the connecting member being of reduced depth, so that when in its normal position the outer portion of the lower edge thereof will lie above the stop 35 on the base member. The offset inner part of the connecting member has its extreme inner portion 38 in flat engagement with the lower wall of the tubular member and the outer portion of this offset portion is inclined, as shown at 39, from the flat portion 38 to the shoulder 37. The upper edge of the connecting member lies flat against the top wall of the tubular member when the parts are in their normal positions, and terminates adjacent to the transverse vertical plane of the shoulder 37. When the parts are in their normal positions, as shown in Fig. 2, the cooperating stops 35 and 37 will prevent the connecting member being withdrawn from the base member but will permit the free inward and outward movement of the connecting member with relation to the base, this movement being limited in one direction by the stops and in the other direction by the supporting member of the hanger. Thus the hangers can be quickly and easily adjusted to accommodate them to the distance between the runways and when the cradle is slid lengthwise of the runways the hangers will automatically accommodate themselves to the variations in the distance between the flanges, which are not always in true parallelism. By moving the connecting member outwardly until the stop 37 is adjacent to or in contact with the stop 35, and then moving the outer end of the connecting member downwardly to tilt the same, as shown in dotted lines in Fig. 3, the shoulder or stop 37 will be moved to a position above the level of the stop 35 and the connecting member may be withdrawn from the tubular base member. To reinsert the connecting member in the base member it is tilted so as to permit the tapered end thereof to be inserted in the tubular member and the shoulder 37 moved across the stop 35, after which the connecting member is moved to its normal position parallel with the base member and the stops thus brought into cooperative relation.

The jack 25 may be of any suitable construction and is here shown as a pawl and ratchet jack of a well known type. It comprises a standard 40 in which is mounted a toothed lifting element 41 and is provided with a lever or operating handle 42 by means of which the lifting element may be actuated. It is also provided with a reversing device 43 to permit the lifting element to be moved either upwardly or downwardly by the manipulation of the operating handle. The standard 40 of the jack rests loosely upon the top of the base so that it may be slid lengthwise thereof to any desired location and it is retained in position on the jack by a depending portion 44 which fits snugly but slidably in the guideway 30 and which is preferably formed in two parts to permit the lifting element to move downwardly through the same. The lifting jack is of such a height that when in its upright position, even if the lifting element is lowered, it will project into the path of an axle or other part of an automobile which is being driven onto the lift. To avoid this interference the jack is so mounted on the cradle that it can be folded into a substantially horizontal position adjacent to the cradle where it will be out of the way of all parts of the automobile, and after the automobile is in position on the lift the jack can be again moved to its upright position. The jack may be mounted on the cradle in any suitable manner to permit of its being folded to this horizontal position and when the jack is connected with the cradle in the manner above described I prefer to so construct the same that it can be tilted about one edge which is transverse to the cradle and thus folded onto and lengthwise of the cradle. The lower or base end of the standard is here shown as provided with flanges to provide a firm support on the cradle and at least one of the base flanges, which extends transversely to the cradle, is of a relatively narrow width so that the jack can be readily tilted about that edge of the base to the position shown in dotted lines in Fig. 2. This tilting or folding of the jack onto the base of the cradle will, of course, disengage the depending portion 44 of the standard from the cradle and in order to retain the jack on the cradle while it is in its folded position I have provided the standard, adjacent to that edge of the base about which it is tilted, with flanges 46 which project lengthwise of and above the guideway in the cradle base when the jack is in its normally upright position. As the jack is tilted about the adjacent edge of the standard the flanges will enter the guideway and will thus hold the jack against displacement while in its folded position. If desired, the upper end of the standard may be provided on that side adjacent to the flanges 46 with a projection 47 to engage the base and support the jack in a substantially horizontal position.

The cradle may be adjusted lengthwise of the runways and the jack may be adjusted transversely of the runways for substantially the full length of the cradle but it sometimes happens that it is desirable to connect the jack with some part of the automobile with which its lifting element cannot be moved into alinement. For example, it is sometimes desirable to engage the jack with the frame member 48 of the automobile body which is located in a position directly above the supporting member 28 of the hanger, as shown in Fig. 5, and the jack cannot be moved outwardly far enough to place the lifting element under this frame member. To enable the jack to be connected with such parts I have provided the same with a supplemental load engaging member 49 which may be connected with the lifting element 41 and may extend in any desired direction from that element. As here shown, the lifting element is provided at its upper end with a head 50 which constitutes the usual load engaging element. This head is substantially square in shape, when viewed from above, and it is provided on each of its four sides with a pair of lugs 51 spaced one from the other and preferably formed integral with the head. The load engaging member 49 is of a length considerably greater than the width of the head 50 and has at one end thereof a downwardly extending lug 52 preferably formed integral therewith, adapted to extend between the lugs of any one of the several pair of lugs and provided at its lower end with laterally extending projections or fingers 53 adapted to engage beneath those lugs, as shown in Fig. 5. Arranged between the ends of the member 49 and extending downwardly therefrom is a second lug 54 which is adapted to extend between the lugs on that side of the head 50 opposite the lugs engaged by the projections 53. Thus by tilting the element 49 and engaging the projections 53 beneath the lugs on one side of the head and then moving the element to its horizontal position the lug 54 will be caused to enter between the lugs on the opposite side of the head, thereby holding the element against lateral movement. The member extends for some distance beyond the lug 54 and thus provides a firm load support offset from the lifting element 41. It is readily detachable from the lifting element and may be removed when not needed and quickly attached to the lifting element when it is needed.

When an automobile is to be serviced it is sometimes driven over a pit, instead of elevating the same on a lift. Such a pit usually has on each side thereof an upwardly extending concrete projection or flange which constitutes the guard for the wheels, which are supported on the concrete pavement on the outer sides of the flanges, which thus provide the necessary runways. These concrete guard projections or flanges are usually flat on top and the hangers 55 are provided at their upper ends with flat faced engaging members or hooks 56 which do not hook over the outer sides of the flanges and therefore do not hold the hangers against inward movement. It is therefore desirable to provide means for positively locking the hanger in its adjusted position so that it cannot be accidently displaced from the flange. For this purpose I have shown in Figs. 11 and 12 a slightly modified arrangement of the hanger by means of which the hanger can be positively locked in any one of a plurality of positions with relation to the base 57. The base employed in this construction of the cradle is the same base shown in Figs. 1 to 4 but is inverted to locate a stop 58 at the top of the tubular member instead of at the bottom thereof. The connecting member 59 of the hanger is quite similar to the connecting member 27 above described but differs therefrom in certain respects. The inner end of the connecting member is inclined upwardly and outwardly, as shown at 60, and the inner portion of the lower edge is offset downwardly, as shown at 61, so that the outer portion of the connecting member is of reduced width. The extreme end portion of the lower edge of the connecting member is the only part which engages the lower wall of the tubular member when the parts are in their normal positions. In its upper edge the connecting member is provided with a plurality of recesses 62 each of which is adapted to receive the stop 58 on the tubular member when the hanger has been adjusted with relation to the tubular member and moved into its normal position with relation thereto. By moving the outer end of the hanger downwardly, to tilt the same, the notched upper edge thereof can be moved out of engagement with the stop 58 and the connecting member withdrawn from the tubular member or the connecting member may be inserted in the tubular member by tilting the same with relation thereto, moving the same inwardly to the desired adjustment and then moving it into alinement with the tubular member to cause the stop to be received in the selected notch or recess. Thus the hanger is positively locked against movement with relation to the base when the parts are in their normal positions. It will be understood that after the cradle has been adjusted to accommodate the same to a particular pit this adjustment is retained and it is seldom necessary to again separate the parts.

In Figs. 13 to 16 I have illustrated a form of supplemental lift adapted to be mounted on the rails of a free wheel automobile lift. A free wheel lift comprises parallel rails which engage beneath the axles of the automobile to lift the same and these rails are usually provided with inwardly extending flanges at the upper and lower edges thereof. In the present construction, the rails are H-shaped and comprise vertical webs 63 having flanges 64 at their lower edges and flanges 65 at their upper edges. In this type of supplemental lift the cradle comprises a one piece base 66 here shown as a plate having a longitudinal slot 67a to permit the jack 25 to be mounted thereon and adjusted in the manner above described. Secured to each end of this base plate is a hanger which is preferably U-shaped and has its arms 67 arranged on the opposite sides of the plate 66 and rigidly but detachably secured thereto by removable pins 68 which extend through the respective arms of the hanger and into the plate 66. Preferably each arm has a series of holes 69 into any one of which the pin may be inserted to secure the hanger in adjusted position with relation to the base. The transverse member 70 of the hanger has its outer edge portion 71 adapted to overhang and to rest upon the lower flange 64 of the adjacent rail and is also provided with parts spaced inwardly from its outer edge to engage the inner edge of the flange 64 and hold the hanger against turning movement on the flange. In the present instance, the lower edge of the hanger is recessed, as shown at 72, to receive the flange and the inner wall of the recess bears against the inner edge of the flange. This transverse member of the hanger is also provided, between its ends, with an outwardly extending projection or lug 73 adapted to engage the vertical portion or web 63 of the rail. When the hangers have been assembled in their adjusted positions on the base the overall length of the cradle is approximately equal to but slightly less than the distance between the webs 63 of the two rails. To mount the cradle on the rails it is placed between the two rails lengthwise thereof and supported at a level slightly above the lower flanges 64 of the rails. With the cradle supported in this position it is turned about a vertical axis and the size and shape of the parts are such that it may be moved into a position at right angles to the rails and when in this position the parts 71 will overhang the respective flanges 64 and the shoulder 72 will be arranged above but spaced inwardly slightly with relation to the inner edges of those flanges, and the lugs 73 will be in engagement with or close to the vertical webs of the rails. When the cradle has been moved to this position it is lowered to permit the parts 71 of the hangers to rest upon the flanges 64 with the shoulders 72 in engagement with or close to the edges of the adjacent flanges 64. Thus the cradle is held against further turning movement, by the shoulders 72, and is held against longitudinal movement by the lugs 73 so that there is no possibility of the cradle being disengaged from the rails while it is under load. When the supplemental lift is so mounted upon the rails the jack may be moved into engagement with the desired part of the automobile body and the jack operated to lift the body with relation to the axle and thus separate the leaves of the spring. In this type of cradle the jack 25 is mounted in the base for folding movement to a position substantially parallel with the cradle in the manner above described. The foldable jack is of particular importance in this form of cradle because of the narrow clearance between the cradle and the automobile axle.

While I have shown and described the preferred embodiment of my invention, with certain modifications thereof, I wish it to be understood that I do not desire to be limited to the details thereof as various modifications may occur to a person skilled in the art.

Having now fully described my invention, what I claim as new and desire to secure by Letters Patent, is:

1. A jack supporting cradle adapted to be mounted on the runways of an automobile supporting structure, and including a base having tubular end portions, and hangers having connecting members extending into the respective ends of said base and supporting members adapted to have supporting connection with the respective runways, each hanger and said base having cooperating parts to prevent the withdrawal of said connecting member from said base, said parts being so arranged that when said hanger is in a predetermined abnormal position with relation to said base one of said parts can be moved past the other part to permit said connecting member to enter said base and when said hanger is in its normal position with relation to said base said parts will be supported in cooperating relation.

2. A jack supporting cradle adapted to be mounted on the runways of an automobile supporting structure, and including a base having tubular end portions, and hangers having connecting members extending into the respective ends of said base and supporting members adapted to have supporting connection with the respective runways, each hanger and said base having cooperating parts to prevent the withdrawal of said connecting member from said base, said parts being so arranged that when said hanger is in a predetermined abnormal position with relation to said base one of said parts can be moved past the other part to permit said connecting member to enter said base and when said hanger is in its normal position with relation to said base said parts will be supported in opposed relation to retain said connecting member in said base and to permit said connecting member to be adjusted lengthwise of said base.

3. A jack supporting cradle adapted to be mounted on the runways of an automobile supporting structure and including a base having tubular end portions, and hangers having connecting members extending into the respective ends of said base and supporting members adapted to have supporting connection with the respective runways, said base having near one end thereof a part forming a stop, and the connecting member of the adjacent hanger also having a part forming a stop, said connecting member being so shaped that when it is supported at an angle to said base and inserted therein its stop will move past the stop of said base and will then be moved into opposed relation to the stop of said base by the movement of said connecting member into substantial parallelism with said base.

4. A jack supporting cradle adapted to be mounted on the runways of an automobile supporting structure and including a base having tubular end portions, and hangers having connecting members extending into the respective ends of said base and supporting members adapted to have supporting connection with the respective runways, said base having near one end thereof a part forming a stop, and the connecting member of the adjacent hanger also having a part forming a stop, said connecting member being so shaped that when it is supported at an angle to said base and inserted therein its stop will move past the stop of said base and will then be moved into opposed relation to the stop of said base by the movement of said connecting member into substantial parallelism with said base, the stop on said connecting member being spaced from the outer end of said member so that it will be spaced inwardly from the stop on said base when said connecting member is fully inserted in said base.

5. A jack supporting cradle adapted to be mounted on the runways of an automobile supporting structure, and including a base having tubular end portions, and hangers having connecting members extending into the respective ends of said base and supporting members adapted to have supporting connection with the respective runways, said base having a stop extending inwardly from its bottom wall at one end thereof, and the connecting member of the adjacent hanger having its inner end sloped inwardly and downwardly and having the inner portion of its lower edge offset from the outer portion of said edge to form an outwardly facing shoulder which will be in alinement with said stop when the inner end of said connecting member is in engagement with the bottom wall of said base and will be at a higher level than said stop when said member is tilted to elevate the inner member thereof.

6. In a cradle of the character described, a base having a tubular end portion provided with a part forming a stop, and a hanger comprising a supporting member and a connecting member carried by said supporting member and extending into the tubular end of said base, said connecting member having a part forming a stop and arranged to cooperate with the stop on said base to prevent the withdrawal of said connecting member while said base and said hanger are in their normal relative positions, said connecting member having its inner end inclined and having a portion of reduced depth to permit said member to be tilted with relation to said base and withdrawn therefrom.

7. In a cradle of the character described, a horizontal base comprising an elongated tubular member of a width substantially less than its depth, a stop rigidly mounted on each end of said tubular member at the bottom thereof, and hangers at the respective ends of said base, each hanger comprising a supporting member and a connecting member carried by said supporting member and extending into the adjacent end of said tubular member, said connecting member having at its lower edge and between the ends thereof a part forming a stop to cooperate with the stop in the adjacent end of said tubular member, said connecting member having its inner end inclined upwardly and outwardly, the upper edge of said connecting member terminating near the transverse vertical plane of the stop at the lower edge thereof.

8. A jack supporting cradle adapted to be mounted on the runways of an automobile supporting structure, and including a base having tubular end portions, and hangers having connecting members extending into the respective ends of said base and supporting members adapted to have supporting connection with the respective runways, each connecting member and the adjacent end of said base having cooperating parts to hold said connecting member against inward or outward movement with relation to said base when said base and said connecting member are in their normal relative positions, said connecting member being tiltable with relation to said base to disconnect said parts and permit said connecting member to be withdrawn from or inserted in said base.

9. In a cradle of the character described, a horizontal base comprising an elongate tubular member having in its upper portion and near each end thereof a part forming a stop, and hangers at the respective ends of said base, each hanger comprising a supporting member and a connecting member carried by said supporting member and extending into said tubular base member, said connecting member having at its upper edge parts arranged to embrace said stop and hold said connecting member against inward or outward movement with relation to said base member when said base and said connecting member are in their normal relative positions, said connecting member also having its inner end inclined upwardly and outwardly and having the outer portion of its lower edge spaced from the bottom wall of said tubular base member to permit said connecting member to be tilted with relation to said base to disengage said parts thereof from said stop.

10. In a cradle of the character described, a base having a tubular end portion and a hanger comprising a supporting member and a connecting member carried by said supporting member, extending into said tubular end of said base and having a recess in one side thereof, said base having a part arranged to enter said recess and hold said base and said connecting member against relative longitudinal movement when they are in their normal positions, said connecting member having its inner end inclined and having a portion of reduced depth to permit it to be tilted to disengage the same from said part of said base.

11. In an automobile lift, a cradle having a substantially horizontal jack supporting part, and means for supporting the same on said lift, a lifting jack comprising a supporting member, a vertically movable lifting element, and means for actuating said lifting element, said supporting member having means for supporting said jack normally in an upright position on said cradle and being foldable to a substantially horizontal position on said cradle, said supporting member and said cradle having parts arranged to cooperate when said jack is in its folded position to retain the folded jack against lateral displacement on said cradle.

12. In an automobile lift, a cradle having a substantially horizontal jack supporting part, and means for supporting the same on said lift, a lifting jack comprising a supporting member, a vertically movable lifting element, and means for actuating said lifting element, said supporting member having means for supporting said jack normally in an upright position on said cradle and being foldable to a substantially horizontal position on said cradle, said supporting member and said cradle having parts arranged to cooperate when said jack is in its folded position to retain the folded jack against lateral displacement on said cradle, and said supporting member having a part to engage said cradle and support the folded jack in a substantially horizontal position.

13. In an automobile lift, a cradle having a substantially horizontal jack supporting part, and means for supporting the same on said lift, a lifting jack comprising a supporting member, a vertically movable lifting element, and means for actuating said lifting element, said supporting member having means for supporting said jack normally in an upright position on said cradle and being foldable to a substantially horizontal position on said cradle, said supporting member having a normally inoperative part arranged to be moved into cooperative relation to said cradle by the movement of said jack to its folded position and to hold the folded jack against displacement on said cradle.

14. In an automobile lift having parallel load supporting members and including a cradle having at its ends means for attaching the same to the parallel load supporting members of said lift and having a slot extending transversely to said members, a lifting jack comprising a standard, a vertically movable lifting element adapted to extend through said slot, and means for actuating said lifting element, said standard having means for supporting the same in an upright position on said cradle and for holding the same against lateral displacement while in said upright position and being movable about an axis transverse to said cradle to a position on and substantially parallel with said cradle, said standard having a part arranged to extend into said slot while said jack is in its folded position and to hold said jack against lateral displacement with relation to said cradle.

15. In an automobile lift having parallel load supporting members and including a cradle having at its ends means for attaching the same to the parallel load supporting members of said lift and having a slot extending transversely to said members, a lifting jack comprising a standard, a vertically movable lifting element adapted to extend through said slot, and means for actuating said lifting element, said standard having means for supporting the same in an upright position on said cradle and for holding the same against lateral displacement while in said upright position and being movable about an axis transverse to said cradle to a position on and substantially parallel with said cradle, said standard having a part arranged to extend into said slot while said jack is in its folded position and to hold said jack against lateral displacement with relation to said cradle, and said standard also having a part spaced from said transverse axis to engage said cradle and support the folded jack in a position substantially parallel with said cradle.

16. In an automobile lift having parallel load supporting members and including a cradle having at its ends means for attaching the same to the parallel load supporting members of said lift and having a slot extending transversely to said members, a lifting jack comprising a standard mounted on said cradle normally in an upright position and tiltable about a lower transverse edge thereof to fold said jack to a position on and substantially parallel with said cradle, a lifting element carried by said standard and extending through said slot, and means for actuating said lifting element, said standard having a depending portion extending into said slot when said jack is in its upright position and also having a part arranged to extend above and lengthwise of said cradle when said jack is in its upright position and to enter said slot when said jack is moved to its folded position to hold said jack against lateral displacement with relation to said cradle.

ION V. K. HOTT.